United States Patent
Larson et al.

(10) Patent No.: US 10,586,233 B1
(45) Date of Patent: *Mar. 10, 2020

(54) THIRD-PARTY AUTHENTICATION SYSTEMS AND METHODS

(71) Applicant: West Corporation, Omaha, NE (US)

(72) Inventors: Larry Trent Larson, Bennington, NE (US); Chad Lynn Brockman, Omaha, NE (US); April Lynn Peek, Elkhorn, NE (US); Eric A. Grun, Omaha, NE (US); Kenneth A. Marr, Ashland, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,772

(22) Filed: Apr. 11, 2017

Related U.S. Application Data (63) Continuation of application No. 12/847,714, filed on Jul. 30, 2010, now Pat. No. 9,619,826.

(51) Int. Cl.
*G06Q 30/00* (2012.01)
*G06Q 20/40* (2012.01)
*G06Q 20/16* (2012.01)
*G06Q 20/30* (2012.01)

(52) U.S. Cl.
CPC ....... *G06Q 20/40145* (2013.01); *G06Q 20/16* (2013.01); *G06Q 20/305* (2013.01)

(58) Field of Classification Search
CPC . G06Q 30/02; G06Q 30/0276; G06Q 30/0613
USPC .................................................. 705/26, 27
See application file for complete search history.

(56) References Cited

U.S. PATENT DOCUMENTS

| | | | |
|---|---|---|---|
| 7,698,566 B1* | 4/2010 | Stone ...................... | H04L 63/08 713/186 |
| 8,127,345 B2* | 2/2012 | Gregg ....................... | G06F 7/04 726/7 |
| 2004/0236702 A1* | 11/2004 | Fink ...................... | G06Q 20/382 705/73 |
| 2006/0015743 A1* | 1/2006 | Camaisa ................. | G06F 21/31 713/182 |

(Continued)

OTHER PUBLICATIONS

Damiani, M. L., Bertino, E., & Silvestri, C. (2008). Spatial domains for the administration of location-based access control policies. Journal of Network and Systems Management, 16(3), 277-302. doi:http://dx.doi.org/10.1007/s10922-008-9106-0, 27pgs.(Year: 2008).*

*Primary Examiner* — Robert M Pond (57) ABSTRACT

The illustrative embodiments described herein provide systems and methods for authenticating a customer in an online transaction. In one embodiment, a method includes initiating, in conjunction with an online transaction, an authentication query via a communication device associated with a customer in the online transaction, receiving customer authentication data from the communication device, sending the customer authentication data to a third-party authentication server to authenticate the customer using the customer authentication data, receiving a determination from the third-party authentication server whether the customer is authenticated, and allowing the online transaction to proceed in response to receiving the determination that the customer is authenticated.

20 Claims, 8 Drawing Sheets

(56) References Cited

U.S. PATENT DOCUMENTS

| | | | |
|---|---|---|---|
| 2006/0140386 A1* | 6/2006 | Morganstein | G06F 21/32 379/224 |
| 2008/0227471 A1* | 9/2008 | Dankar | G06Q 20/3224 455/456.6 |

* cited by examiner

THIRD-PARTY AUTHENTICATION SYSTEMS AND METHODS

CROSS-REFERENCE TO RELATED APPLICATIONS

The present patent application is a continuation of and claims priority from patent application Ser. No. 12/847,714, titled THIRD-PARTY AUTHENTICATION SYSTEMS AND METHODS, filed Jul. 30, 2010, the entire contents of which are enclosed by reference herein.

BACKGROUND

Field of the Invention

The present invention relates generally to systems and methods for authenticating a customer. More particularly, the present invention relates to improved third-party authentication systems and methods.

Description of the Related Art

With the rise of the Internet, online (or web-based) transactions have become an increasingly common method of commerce. Online transactions allow a consumer to conduct an online transaction (e.g., purchase of a good) using a communication device, such as the consumer's phone or computer. However, because online transactions do not require face-to-face contact with a vendor, the potential for fraud, such as identity theft, should be guarded against. For example, a perpetrator may attempt to conduct online transactions using the identity of another person, thereby allowing the perpetrator to fraudulently make a purchase using the account or financial information of the victim. Current authentication systems may fail to offload authentication functionality to a third party, such as a separate authentication system whose primary function is to authenticate customers, and may further fail to authenticate customers using multi-factor authentication methods.

SUMMARY

The illustrative embodiments described herein are directed to a data processing system and, in particular, to systems and methods for authenticating a customer in an online transaction. In one embodiment, a method includes initiating, in conjunction with an online transaction, an authentication query via a communication device associated with a customer in the online transaction, receiving customer authentication data from the communication device, sending the customer authentication data to a third-party authentication server to authenticate the customer using the customer authentication data, receiving a determination from the third-party authentication server whether the customer is authenticated, and allowing the online transaction to proceed in response to receiving the determination that the customer is authenticated.

In another embodiment, a method includes receiving customer authentication data from an authentication interface system. The customer authentication data is associated with a customer in an online transaction. The method includes accessing customer reference data from a customer database, comparing the customer authentication data to the customer reference data to make a determination whether the customer is authenticated, and sending the determination as to whether the customer is authenticated to the authentication interface system.

In another embodiment, an online transaction authentication system to authenticate a customer includes an authentication interface system, implemented by a web server, to interface with a customer in an online transaction. The authentication interface system collects customer authentication data from the customer. The online transaction authentication system also includes an authentication system, implemented by an authentication server, to receive the customer authentication data from the authentication interface system and to authenticate the customer in the online transaction by comparing the customer authentication data to customer reference data.

DETAILED DESCRIPTION

Figure 1:
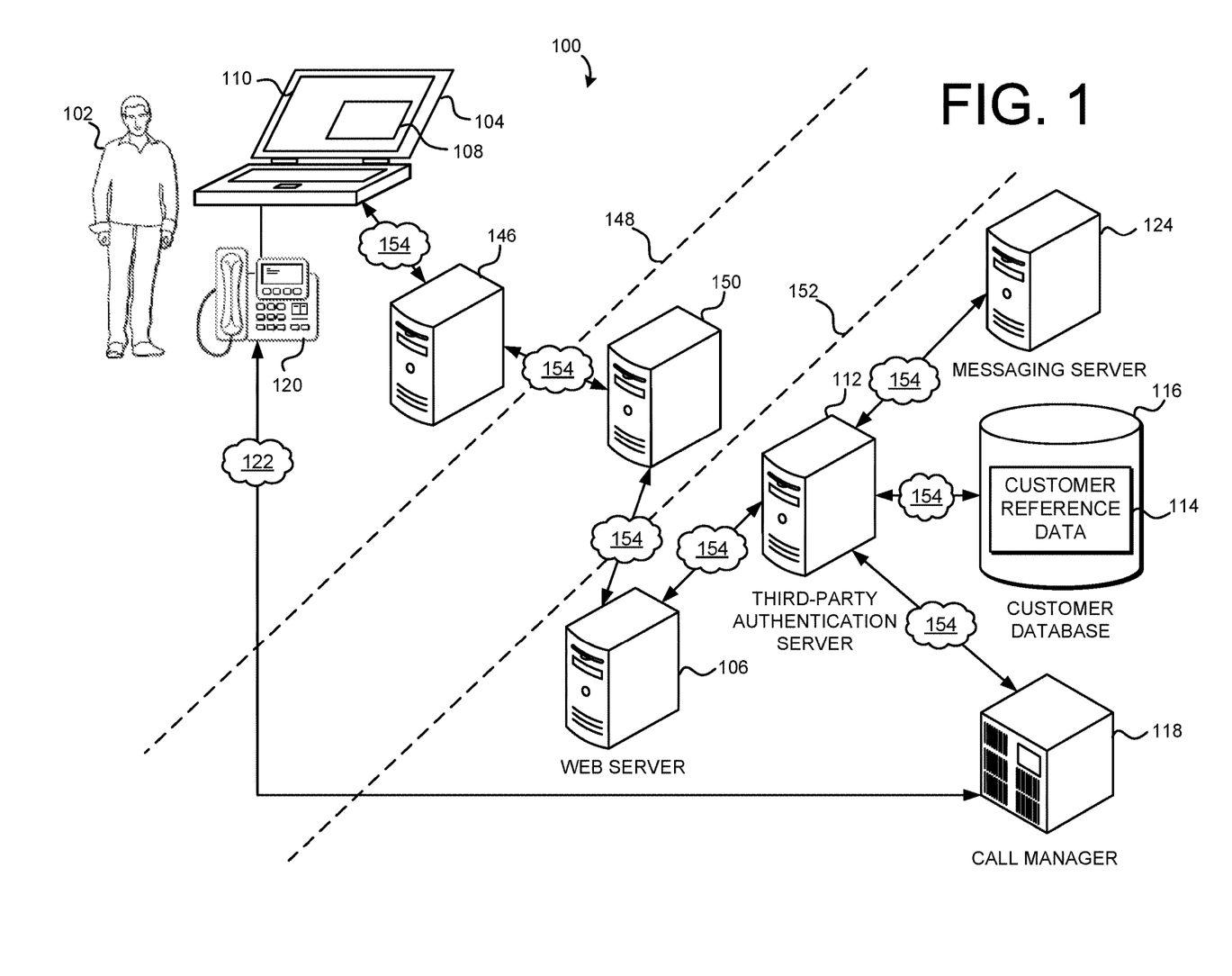
FIG. 1 is a schematic, pictorial representation of a data processing network in which an online transaction authentication system may be implemented according to an illustrative embodiment.
Figure 2:
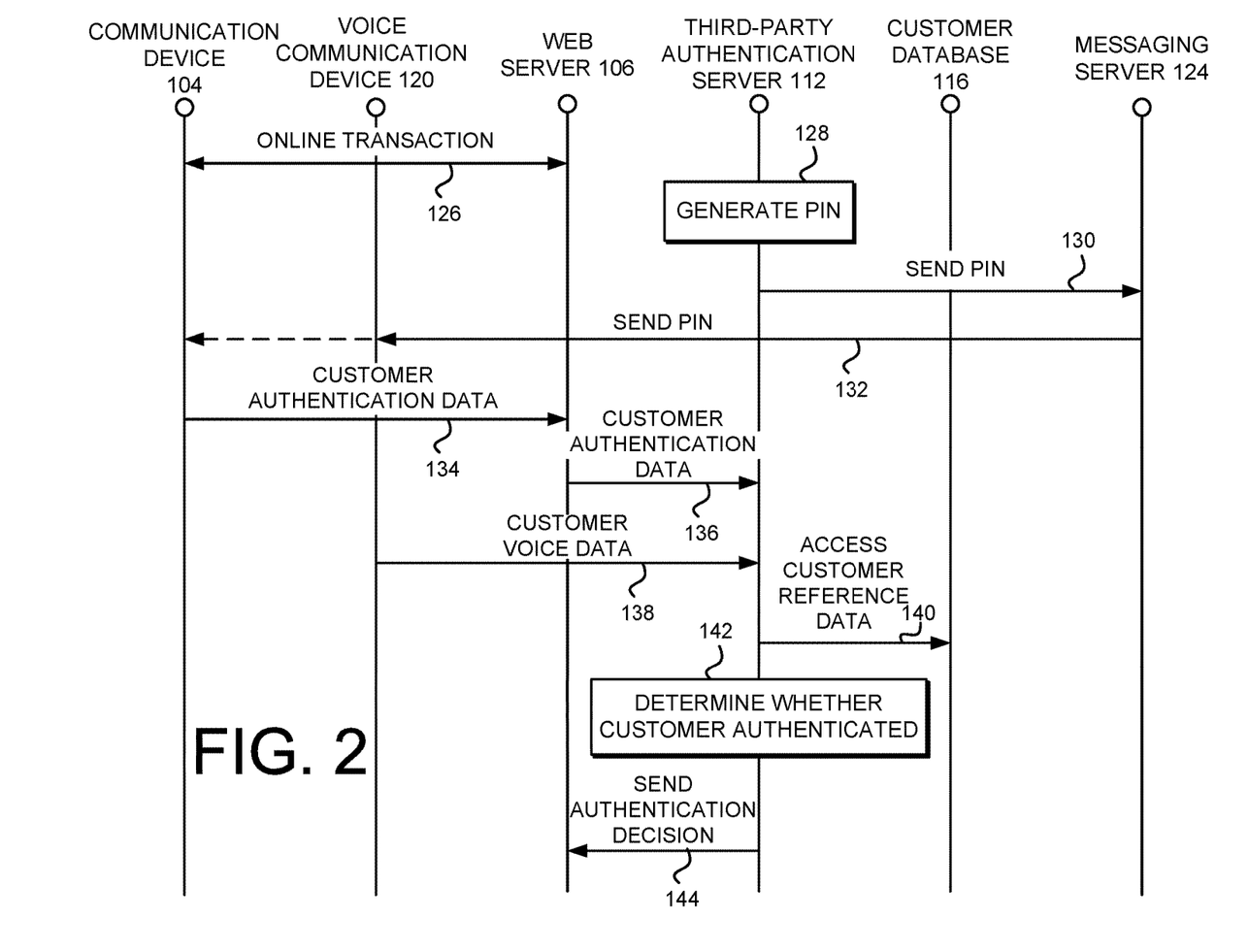
FIG. 2 is a schematic diagram showing the interaction between a portion of the elements in FIG. 1 according to an illustrative embodiment.

Referring to FIGS. 1 and 2, an illustrative embodiment of a data processing network 100 implements an online transaction authentication system that includes a customer 102 conducting an online transaction on a communication device 104. The communication device 104 may be any device capable of interfacing with the user 106, such as a cellular phone (e.g., a smart phone), an interactive television, a computer (e.g., a laptop, netbook, tablet computer, or mini-computer), a personal digital assistant, a digital music player, a digital reader, a portable gaming device, a web browsing device, a media player, or any other electronic device capable of communicating data. Unless otherwise indicated, as used herein, "or" does not require mutual exclusivity. The online transaction authentication system authenticates the customer 102 in the online transaction to ensure that the customer 102 is authorized to conduct the online transaction.

In one embodiment, a web server 106 is in data communication with the communication device 104 to initiate an authentication query 108 on a graphical user interface 110 of the communication device 104. The authentication query 108 may be initiated by the web server 106 in conjunction with the online transaction with which the customer 102 is involved. The web server 106 receives customer authentication data inputted by the customer 102 into the communication device 104, and the web server 106 then passes the customer authentication data to a third-party authentication server 112. The third-party authentication server 112 may be administered or managed by a separate entity than the entity that administers or manages the web server 106. The customer authentication data includes any data that may be used to authenticate the customer 102, such as one or more customer credentials, a personal identification number, etc. The customer credentials that may be inputted by the customer 102 and used by the online transaction authentication system to authenticate the customer 102 may include the customer's name, address, user name, password, financial information, social security number, or any other data known by or associated with the customer 102.

The third-party authentication server 112, upon receiving the customer authentication data from the web server 106, may compare the customer authentication data to customer reference data 114. The third-party authentication server 112 may access a customer database 116 to retrieve the customer reference data 114. The customer database 116 may be stored in any storage device. The customer reference data 114 is data against which the customer authentication data entered by the customer 102 may be compared to verify the identity of the customer 102. Such customer reference data 114 may be associated with a particular customer account involved in the online transaction. For example, the customer reference data 114 may include a username and password for an account involved in the online transaction. The third-party authentication server 112 may then compare the username and password received from the customer 102, via the communication device 104 and the web server 106, with the username and password contained in the customer reference data 114. Based on this comparison, the third-party authentication server 112 may determine whether the customer 102 is authenticated to proceed with the online transaction. In one particular example, the customer 102 is authenticated if the username and password entered by the customer 102 match the username and password in the customer reference data 114 for the account being used by the customer 102.

Based on the comparison by the third-party authentication server 112 between the customer authentication data and the customer reference data 114, the third-party authentication server 112 makes a determination as to whether the customer 102 is authenticated for the online transaction. In one embodiment, the third-party authentication server 112 may notify the web server 106 whether the customer 102 is authenticated. Based on whether or not the customer 102 is authenticated, either or both of the web server 106 or the third-party authentication server 112 may allow or disallow the online transaction to proceed. Thus, the online transaction authentication system may prevent an unauthorized person from conducting an online transaction using an account of the customer 102.

A customer credential or personal identification number are only two examples of criteria, or "factors", that may be used to authenticate the customer 102. Indeed, any number of authentication factors may be used to authenticate the customer 102, and any data that can be obtained from the authenticating transaction may be used in the authentication process. For example, in another embodiment, the third-party authentication server 112 may use data associated with the communication device 104, such as internet protocol address, serial number, internet service provider, etc., to authenticate the customer 102. The third-party authentication server 112 may also use the location of the customer 102 by, e.g., determining the location of the communication device 104, to authenticate the customer 102. Data regarding the communication device 104 or the location of the customer 102 may then be compared to data gathered from previous authentication attempts or transactions by that customer 102.

In one embodiment, the third-party authentication server 112 may use voice recognition to authenticate the customer 102. In this embodiment, the data processing network 100 may include a call manager 118 in data or voice communication with a voice communication device 120, such as a phone, phone-enabled computer, etc. The call manager 118 may be implemented by a private branch exchange, an automatic call distributor (ACD), or any other device capable of collecting voice data from the customer 102. In collecting the customer voice data from the customer 102 via the voice communication device 120, the call manager 118 may utilize time-division multiplexing (TDM) or Voice Over IP (VOIP) outdial, and may communicate over a data communication medium 122, such as public switched telephone network (PSTN). In one embodiment, the customer 102 may be prompted by the voice communication device 120 to speak a particular word or phrase to form the customer voice data used for authentication purposes. Non-limiting examples of the word or phrase that the customer 102 may be prompted to speak include the customer's name, a passphrase, a personal identification number, etc. The call manager 118 may relay the customer voice data to the third-party identification server 112. The third-party authentication server 112 may then compare the customer voice sample to voice reference data included in the customer reference data 114. The voice reference data may be a voice sample, or data derived therefrom, that is known to be the voice of the customer 102 associated with the account being used to conduct the online transaction. In one non-limiting example, the voice reference data may be embodied as a sound file, such as a wave file or mp3 file. Any method of voice recognition or comparison may be utilized by the third-party authentication server 112, including speaker-dependent or speaker-independent recognition techniques.

Based on the comparison between the customer voice sample received by the call manager 118 and the voice reference data, the third-party authentication server 112 may determine whether the customer 102 is authenticated based on this voice sample. As mentioned above, voice recognition may be employed with other authentication factors to authenticate the customer 102. In another embodiment, instead of using the voice communication device 120, which is separate from the communication device 104, the customer voice sample may be spoken into the communication device 104 itself, which then relays the customer voice sample to the call manager 118, thereby dispensing with the need for two separate devices (i.e., the communication device 104 and the voice communication device 120).

As mentioned above, the customer 102 may be authenticated using a personal identification number inputted by the customer 102. In one embodiment, the third-party authentication server 112 may generate a personal identification number for the customer 102 involved in the online transaction. The third-party authentication server 112 may send this personal identification number to a messaging server 124. In one example, the messaging server 124 may be an exchange server or a short message service (SMS) server. The messaging server 124 may send the personal identification number generated for the online transaction to the customer 102 using any of a variety of techniques, such as by e-mail to an e-mail account associated with the customer 102, a text message to the communication device 104, a phone call to the voice communication device 120, etc. The customer 102, having received the personal identification number generated by the third-party authentication server 112, may then input the personal identification number into the authentication query 108. The web server 106 may relay the personal identification number inputted by the customer 102 to the third-party authentication server 112. Upon receiving the personal identification number inputted by the customer 102, the third-party authentication server 112 may compare this received personal identification number with the personal identification number that was generated and sent to the customer 102. The customer 102 will be authenticated if the customer 102 inputted the same personal identification number in the authentication query 108 as was generated by the third-party authentication server 112. In another embodiment, instead of using a dynamically-generated personal identification number, the account associated with the customer 102 may be statically or semi-statically associated with a personal identification number with which to compare the personal identification number inputted by the customer 102. In another embodiment, the method by which the messaging server 124 sends the generated personal identification number to the customer 102 may be in accordance with a preference selected by the customer 102; these and other account preferences of the customer 102 may be stored in the customer database 116.

With particular reference to FIG. 2, an illustrative embodiment of the interaction between a portion of the elements in the data processing network 100 is shown. The communication device 104 and the web server 106 are in data communication in conjunction with an online transaction (data communication 126). A personal identification number may be generated by the third-party authentication server 112 (process 128). The third-party authentication server 112 sends the personal identification number to the messaging server 124 (data communication 130). The messaging server 124 may then send the personal identification number to either or both of the communication device 104 or the voice communication device 120 (data communication 132). The personal identification number may be sent using any of the techniques described above. The communication device 104 may send the customer authentication data inputted by the customer 102 to the web server 106 (data communication 134). The web server 106 may then relay the customer authentication data to the third-party authentication server 112 (data communication 136). In one embodiment, the customer 102 may speak a voice sample into the voice communication device 120, and the voice communication device 120 may send the customer voice data to the third-party authentication server 112 (data communication 138). The third-party authentication server 112 may access customer reference data from the customer database 116 (data communication 140). Comparing the customer authentication data or the customer voice data to the customer reference data, including the personal identification number generated in process 128, the third-party authentication server 112 may determine whether the customer 102 is authenticated (process 142). The third-party authentication server 112 may then send the decision as to whether the customer 102 is authenticated to the web server 106, which may then allow or disallow the online transaction to proceed (data communication 144).

The data processing network 100 may also include additional servers or devices that facilitate communication within the network. For example, the data processing network 100 may include a proxy server 146 on the customer side of an external-facing firewall 148. In one example, the proxy server 146 may be an Internet Security and Acceleration (ISA) server. The data processing network 100 may also include an internal proxy server 150 between the external-facing firewall 148 and an internal firewall 152. In one embodiment, the internal proxy server 150 may be an F5 server.

The web server 106, which interfaces with the communication device 104, and the third-party authentication server 112, which authenticates the customer 102, are shown to be separate servers. Indeed, the web server 106 may be at a different location or region than the third-party authentication server 112. By separating the respective functionalities of the web server 106 and the third-party authentication server 112, the web server 106 is able to offload authentication processing to the third-party authentication server 112. The architecture of the data processing network 100 also allows the third-party authentication server 112 to utilize multi-factor authentication techniques, including those described above, to authenticate the customer 102 in the online transaction.

The techniques, technologies, or media by which the components of the data processing network 100 intercommunicate are numerous. For example, the data processing network 100, or any portion thereof, may be part of a personal area network (PAN), a local area network (LAN), a campus area network (CAN), a metropolitan area network (MAP), or any other network type. Also, communication between any two of the elements in the data processing network 100 may be direct or indirect. Data communication medium 122 between the call manager 118 and the voice communication device 120, as well as the data communication media 154 between various of the remaining components in the data processing network 100, may be any medium through which data can be communicated. For example, the data communication media 122, 154 may be wired or wireless data connections, and may utilize a virtual private network (VPN), multi-protocol label switching (MPLS), the Internet, CDMA (e.g., cdmaOne or CDMA2000), GSM, 3G, 4G, Edge, an over-the-air network, Bluetooth, or any other data communication media. Any of the transactions occurring in the data processing network 100 may be performed using secure SSL transactions.

In one example, the data processing network 100 may utilize the Internet, with any combination of the data communication media 122, 154 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Figure 3:
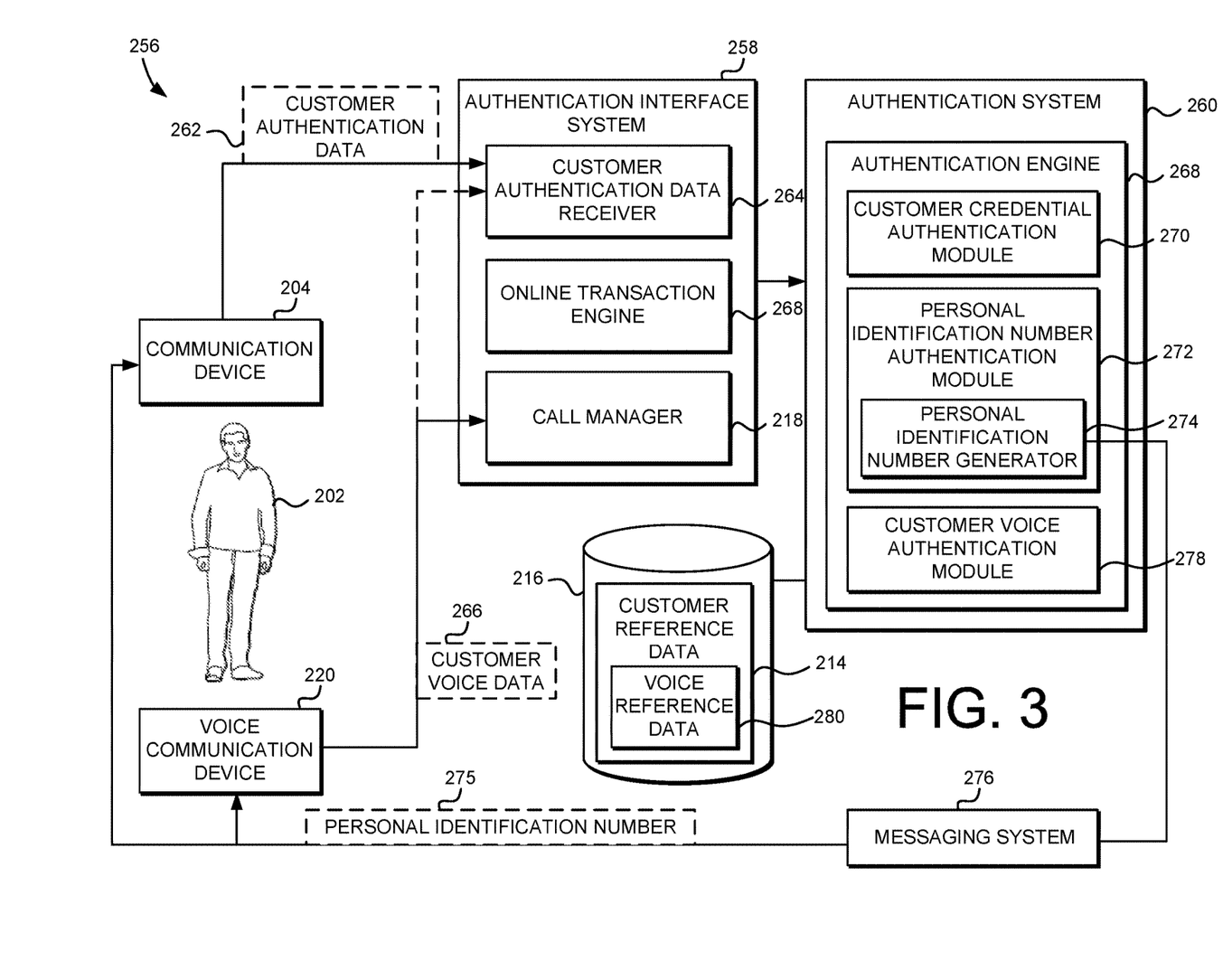
FIG. 3 is a schematic, block diagram of an online transaction authentication system according to an illustrative embodiment.
Figure 4:
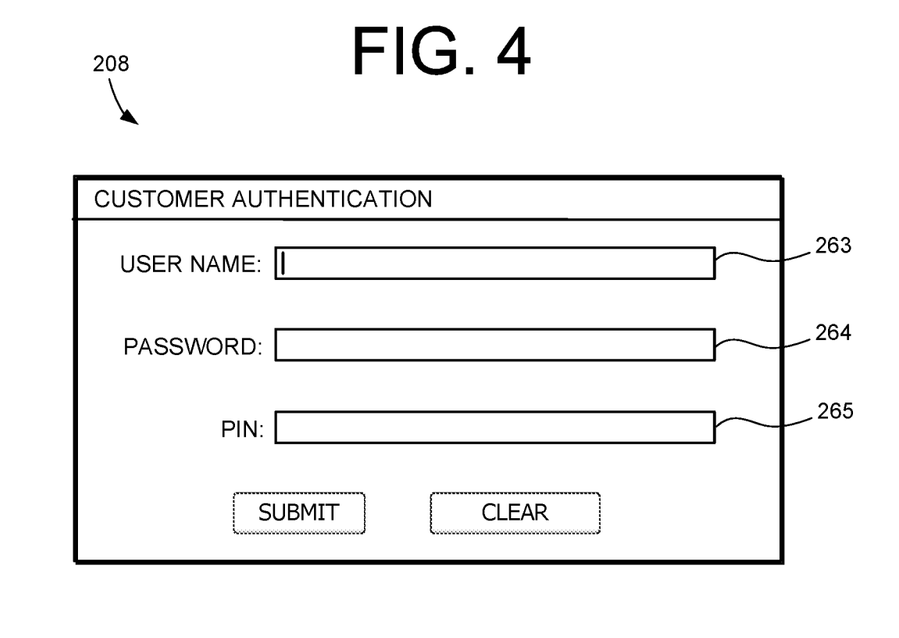
FIG. 4 is a schematic, pictorial representation of an authentication query displayable to a customer according to an illustrative embodiment.

Referring to FIGS. 3 and 4, an illustrative embodiment of the online transaction authentication system 256 includes an authentication interface system 258 and an authentication system 260. Elements of FIG. 3 that are analogous to elements in FIGS. 1 and 2 have been shown by indexing the reference numerals by 100. In one embodiment, the authentication interface system 258 may be implemented by the web server 106 in FIG. 1, and the authentication system 260 may be implemented by the third-party authentication server 112 in FIG. 1. In other embodiments, the authentication interface system 258 and the authentication system 260 may each be administered or managed by separate entities or devices so as to allow the authentication interface system 258 to offload authentication processing to the authentication system 260. The authentication interface system 258 may, in one embodiment, interface with the customer 202 in the online transaction via the communication device 204. The authentication system 260 may receive the customer authentication data 262 from the authentication interface system 258 and authenticate the customer 202 using this customer authentication data 262.

The communication device 204 may be used by the customer 202 to conduct the online transaction. The authentication interface system 258 interfaces with the customer 202 via the communication device 204 to collect the customer authentication data 262. For example, the authentication interface system 258 may initiate an authentication query 208 on the graphical user interface of the communication device 204. A non-limiting example of the authentication query 208 is shown in FIG. 4. The customer 202 may input the customer authentication data 262, or at least a portion thereof, into the authentication query 208. The authentication query 208 includes a set of authentication fields 263, 264, 265, which prompt the customer 202 to input the customer authentication data 262. As used herein, the term "set" encompasses a quantity of one or more. In the example of FIG. 4, the authentication query 208 includes a username authentication field 263, a password authentication field 264, and a personal identification number authentication field 265. Indeed, the authentication fields 263, 264, 265 may prompt the customer 202 to input any combination of data that may be used to authenticate the customer 202, including the examples given above. In one embodiment, once the customer 202 inputs the data into the authentication fields 263, 264, 265, the customer 202 may select a submit button in the authentication query 208, which causes the customer authentication data 262 to be sent to the authentication interface system 258.

In one embodiment, the authentication interface system 258 includes a customer authentication data receiver 264, which receives the customer authentication data 262 from the communication device 204. As described above, the customer authentication data 262 may include one or more customer credentials, a personal identification number, etc. In one embodiment, the call manager 218 may be part of the authentication interface system 258. The call manager 218 may be in data or voice communication with the voice communication device 220. As described in FIG. 1, the call manager 218 may be implemented by a private branch exchange, an automatic call distributor (ACD), or other devices capable of receiving customer voice data 266 from the voice communication device 220. In yet another embodiment, the customer voice data 266 that is spoken by the customer 202 into the voice communication device 220 may be received by the customer authentication data receiver 264. The communication device 204 and the voice communication device 220 may be integrated into a single device according to one illustrative embodiment.

In one embodiment, the authentication interface system 258 may include an online transaction engine 268. In this embodiment, in addition to the interfacing function of the authentication interface system 258, the online transaction engine 268 may facilitate any online transaction for which authentication is being performed by the online transaction authentication system 256. The inclusion of the online transaction engine 268 in the authentication interface system 258 combines the authentication interfacing functionality with transaction management functionality within the authentication interface system 258. However, the authentication interface system 258 may also act in conjunction with other systems or servers, such as vendor systems or servers, to implement the authentication methods of the online transaction authentication system 256.

The authentication interface system 258 may send, or relay, the customer authentication data 262, including the customer voice data 266, to the authentication system 260 to allow the authentication system 260 to perform its authentication function. In one example, the call manager 218 may separately relay the customer voice data 266 to the authentication system 260.

The authentication system 260 compares the customer authentication data 262 to the customer reference data 214 in the customer database 216. The authentication system 260 may access the customer database 216 in order to retrieve the customer reference data 214. The customer database 216 may include customer reference data 214 for any number of customers, including the customer 202.

The authentication system 260 receives the customer authentication data 262, including the customer voice data 266 in some embodiments, and uses this customer authentication data 262 to authenticate the customer 202. The authentication functionality may be performed by an authentication engine 268, which may include one or more modules that authenticate the customer 202 based on one or more respective authentication factors.

In one embodiment, the authentication engine 268 includes a customer credential authentication module 270. The customer credential authentication module 270 may compare the customer credentials in the customer authentication data 262 to the customer reference credentials contained in the customer reference data 214 to make a determination as to whether the customer 202 is authenticated based on customer credentials. Non-limiting examples of the customer credentials with which a comparison may be made include those discussed above.

In one embodiment, the authentication engine 268 may also include a personal identification number authentication module 272. The personal identification number authentication module 272 may compare a personal identification number inputted by the customer 202 into the communication device 204 with a personal identification number that is associated with the account involved in the online transaction. For example, the account being used to conduct the online transaction may have a personal identification number of "1234", and the customer 202 may input the personal identification number of "1234", which will result in a match as determined by the personal identification number authentication module 272.

In another embodiment, the personal identification number authentication module 272 may include a personal identification number generator 274, which generates a personal identification number 275 for the customer 202. The online transaction authentication system 256 may also include a messaging system 276, which may be implemented by the messaging server 124 in FIG. 1, which receives the personal identification number 275 generated by the personal identification number generator 274, and sends the generated personal identification number 275 to either or both of the communication device 204 or the voice communication device 220. The messaging system 276 may send the generated personal identification number 275 to either or both of the communication device 204 or the voice communication device 220 using e-mail, a text message, a phone call reciting the generated personal identification number 275, or any other communication method. The customer 202, upon receiving the personal identification number 275 generated by the personal identification number generator 274, may input the generated personal identification number 275 into the communication device 204. The personal identification number inputted by the customer 202 is received by the authentication interface system 258 and relayed to the authentication system 260 so that the personal identification number authentication module 272 may compare the personal identification number inputted by the customer 202 to the generated personal identification number 275. If there is a match between the personal identification numbers, then the personal identification number authentication module 272 authenticates the customer 202 based on personal identification number authentication.

In another embodiment, the authentication engine 268 may include a customer voice authentication module 278 that compares the customer voice data 266 to voice reference data 280. The voice reference data 280 includes voice samples of customers, such as the customer 202, against which the customer voice data 266 may be compared by the customer voice authentication module 278. For example, the customer voice data 266 may be compared to the voice reference data 284 for the account involved in the online transaction. Any voice recognition or comparison technique may be used, such as speaker-dependent or speaker-independent voice recognition methods. If the customer voice authentication module 278 determines that the customer voice data 266 matches the voice reference data 280, then the customer voice authentication module 278 will determine that the customer 202 is authenticated based on the customer voice data 266.

Any combination of the customer credential authentication module 270, the personal identification number authentication module 272, or the customer voice authentication module 278 may be employed to authenticate the customer 202. For example, one, two, or all three of these modules may be used to authenticate the customer 202. Also, other factors or criteria may be used to authenticate the customer 202, such as biometric data other than the customer's voice (e.g., fingerprint data, retina data, etc.), or an item presented by the customer 202 (e.g., drivers license, passport, etc.). Using any combination of these authentication factors or criteria, once the authentication engine 268 determines whether the customer 202 is authenticated, the authentication system 260 may notify the authentication interface system 258 as to whether the customer 202 has been authenticated. In one embodiment, the authentication interface system 258 may allow the online transaction to proceed if the customer 202 is authenticated. Conversely, if the customer 202 is not authenticated by the authentication system 260, the authentication interface system 258 may disallow the online transaction from proceeding.

Figure 5:
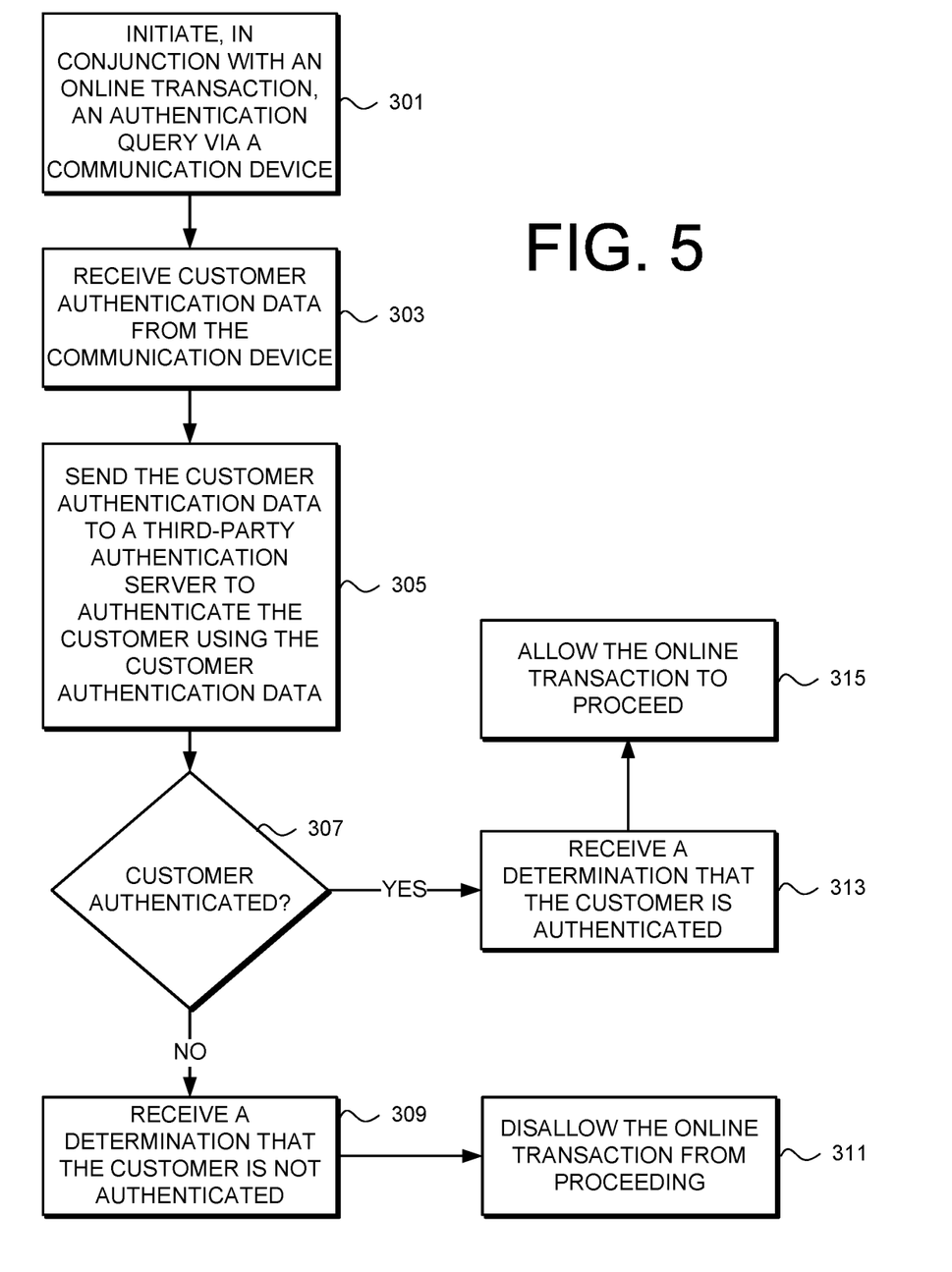
FIG. 5 is a flowchart of a process for authenticating a customer executable by an authentication interface system according to an illustrative embodiment.

Referring to FIG. 5, an illustrative embodiment of a process for authenticating a customer in an online transaction, which may be implemented by the web server 106 in FIG. 1 or the authentication interface system 258 in FIG. 3, includes initiating, in conjunction with an online transaction, an authentication query via a communication device (step 301). The communication device is associated with a customer in the online transaction. The process receives customer authentication data from the communication device (step 303). The process sends the customer authentication data to a third-party authentication server to authenticate the customer using the customer authentication data (step 305).

The process determines whether the customer is authenticated (step 307). If the process determines that the customer is not authenticated, the process receives a determination that the customer is not authenticated (step 309). The process then prevents the online transaction from proceeding (step 311). Returning to step 307, if the process determines that the customer is authenticated, the process receives a determination that the customer is authenticated (step 313). The process then allows the online transaction to proceed (step 315).

Figure 6:
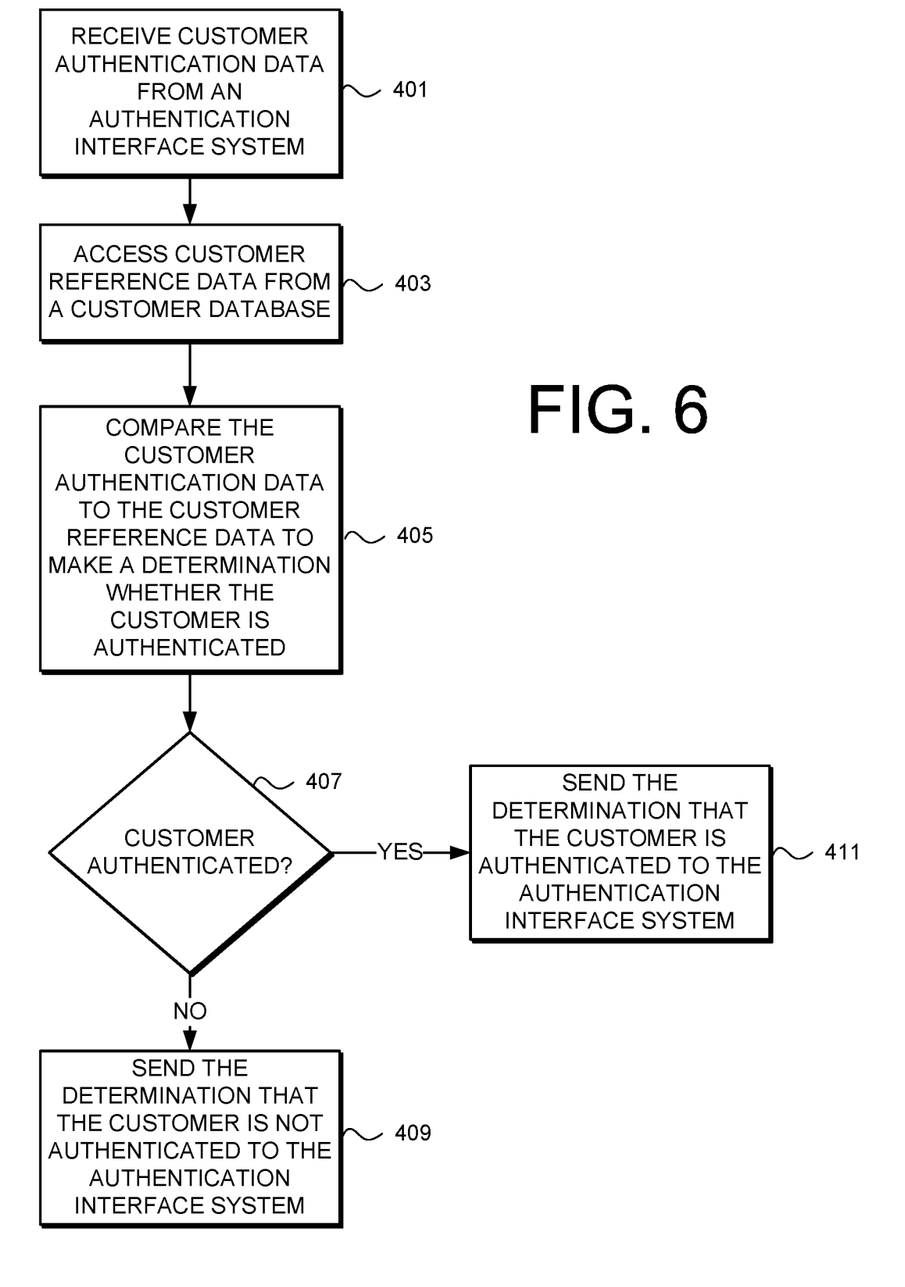
FIG. 6 is a flowchart of a process for authenticating a customer executable by an authentication system according to an illustrative embodiment.

Referring to FIG. 6, an illustrative embodiment of a process for authenticating a customer in an online transaction, which may be executed by a third-party authentication server 112 in FIG. 1 or an authentication system 260 in FIG. 3, includes receiving customer authentication data from an authentication interface system (step 401). The process accesses customer reference data from a customer database (step 403). The process compares the customer authentication data to the customer reference data to make a determination whether the customer is authenticated (step 405).

The process determines whether the customer is authenticated (step 407). If the process determines that the customer is not authenticated, the process sends the determination that the customer is not authenticated to the authentication interface system (step 409). Returning to step 407, if the process determines that the customer is authenticated, the process sends the determination that the customer is authenticated to the authentication interface system (step 411).

Figure 7:
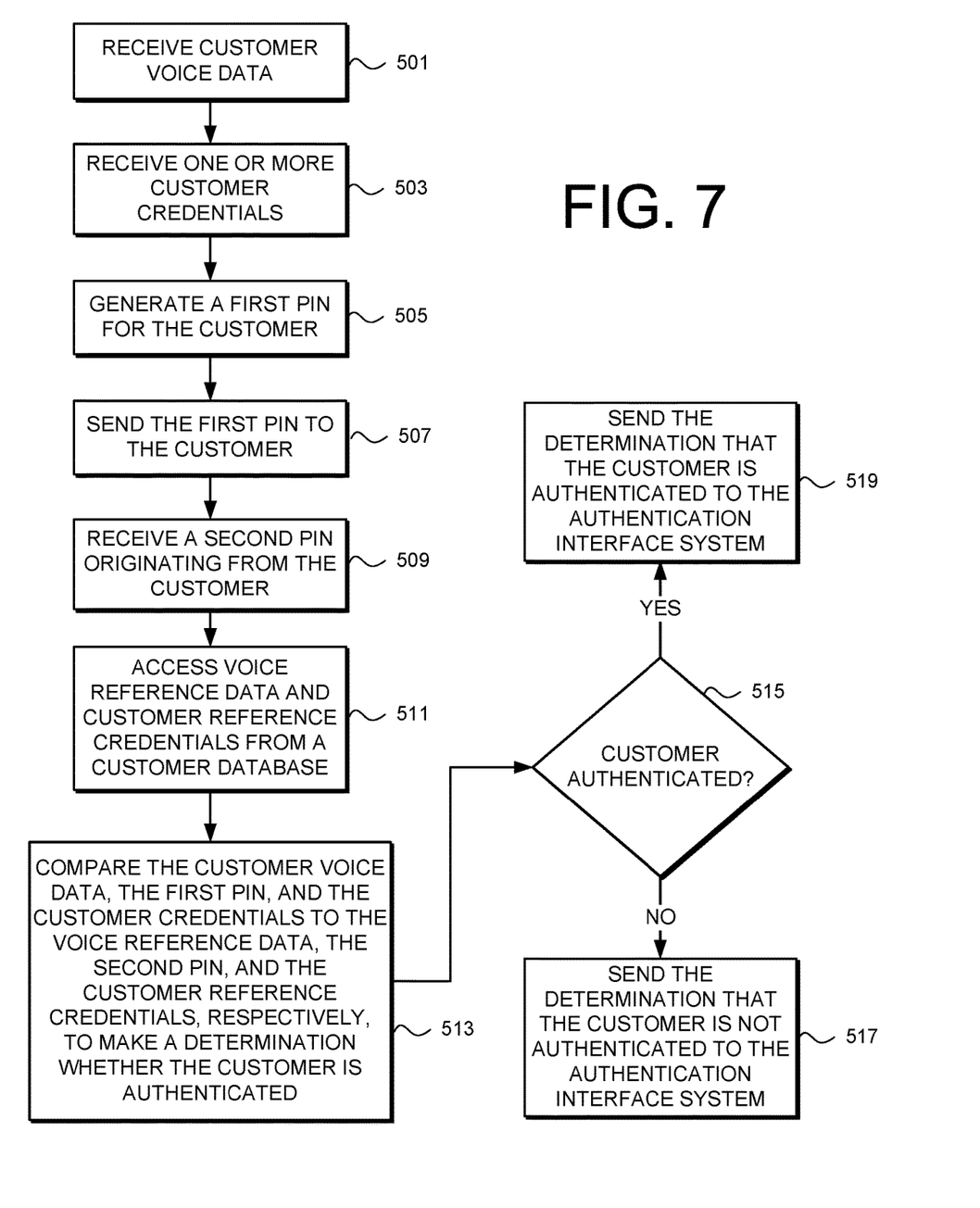
FIG. 7 is a flowchart of a process for authenticating a customer executable by an authentication system according to another illustrative embodiment.

Referring to FIG. 7, an illustrative embodiment of a process for authenticating a customer in an online transaction, which may be implemented by the third-party authentication server 112 in FIG. 1 or the authentication system 260 in FIG. 3, includes receiving customer voice data (step 501). The process receives one or more customer credentials (step 503). The process generates a first personal identification number for the customer (step 505). The process sends the first personal identification number to the customer (step 507). The process receives a second personal identification number originating from the customer (step 509). The process accesses voice reference data and customer reference credentials from a customer database (step 511). The process compares the customer voice data, the first personal identification number, and the customer credentials to the voice reference data, the second personal identification number, and the customer reference credentials, respectively, to make a determination whether the customer is authenticated (step 513).

The process determines whether the customer is authenticated (step 515). If the process determines that the customer is not authenticated, the process sends the determination that the customer is not authenticated to the authentication interface system (step 517). Returning to step 515, if the process determines that the customer is authenticated, the process sends the determination that the customer is authenticated to the authentication interface system (step 519).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures.

For example, in some cases, two blocks shown in succession may be executed substantially concurrently, or the blocks may sometimes be executed in the reverse order, depending upon the functionality involved.

Figure 8:
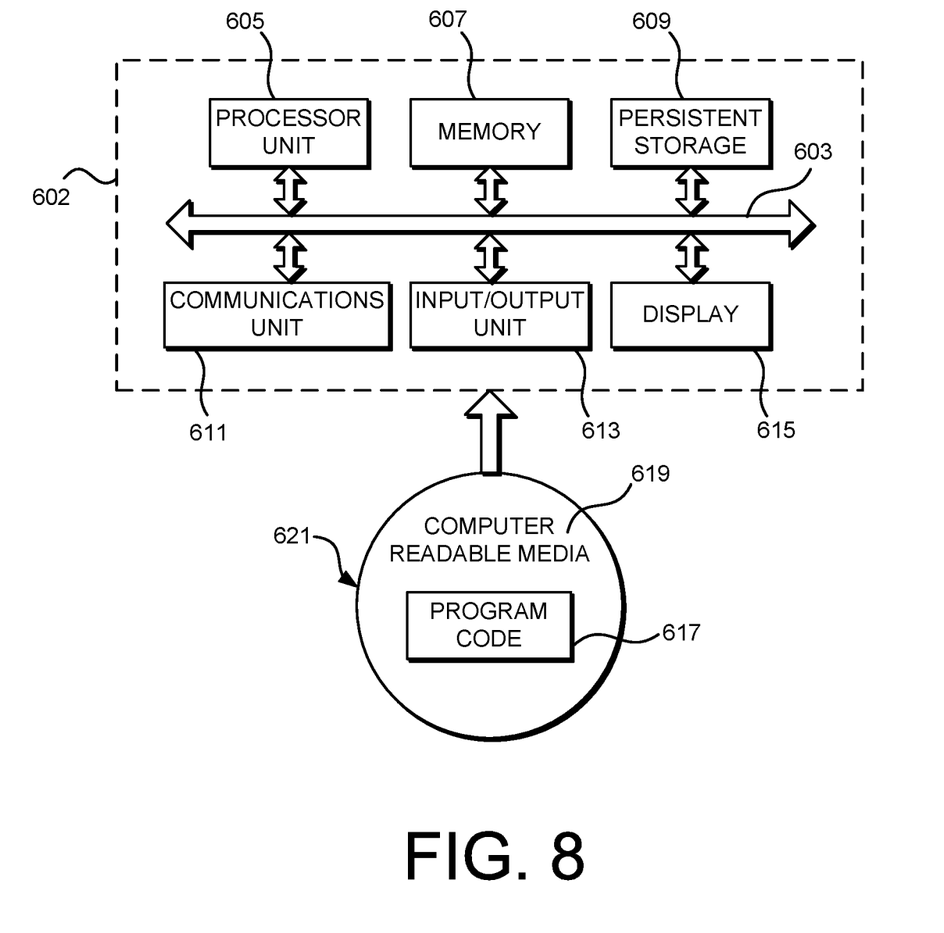
FIG. 8 is a schematic, block diagram of a data processing system in which the illustrative embodiments may be implemented.

Referring to FIG. 8, a block diagram of a computing device 602 is shown in which the illustrative embodiments may be implemented. The computing device 602 may be the web server 106 or the third-party authentication server 112 in FIG. 1. In another embodiment, the authentication interface system 258 or the authentication system 260 described in FIG. 3 may be implemented on the computing device 602. Computer-usable program code or instructions implementing the processes used in the illustrative embodiments may be located on the computing device 602. The computing device 602 includes a communications fabric 603, which provides communications between a processor unit 605, a memory 607, a persistent storage 609, a communications unit 611, an input/output (I/O) unit 613, and a display 615.

The processor unit 605 serves to execute instructions for software that may be loaded into the memory 607. The processor unit 605 may be a set of one or more processors or may be a multi-processor core, depending on the particular implementation. Further, the processor unit 605 may be implemented using one or more heterogeneous processor systems in which a main processor is present with secondary processors on a single chip. As another illustrative example, the processor unit 605 may be a symmetric multi-processor system containing multiple processors of the same type.

The memory 607, in these examples, may be, for example, a random access memory or any other suitable volatile or non-volatile storage device. The persistent storage 609 may take various forms depending on the particular implementation. For example, the persistent storage 609 may contain one or more components or devices. For example, the persistent storage 609 may be a hard drive, a flash memory, a rewritable optical disk, a rewritable magnetic tape, or some combination of the above. The media used by the persistent storage 609 also may be removable. For example, a removable hard drive may be used for the persistent storage 609.

The communications unit 611, in these examples, provides for communications with other data processing systems or communication devices. In these examples, the communications unit 611 may be a network interface card. The communications unit 611 may provide communications through the use of either or both physical and wireless communication links.

The input/output unit 613 allows for the input and output of data with other devices that may be connected to the computing device 602. For example, the input/output unit 613 may provide a connection for user input through a keyboard and mouse. Further, the input/output unit 613 may send output to a processing device. In the case in which the computing device 602 is a cellular phone, the input/output unit 613 may also allow devices to be connected to the cellular phone, such as microphones, headsets, and controllers. The display 615 provides a mechanism to display information to a user, such as a graphical user interface. The display 615 may be used to display the text messages described in the illustrative embodiments.

Instructions for the operating system and applications or programs are located on the persistent storage 609. These instructions may be loaded into the memory 607 for execution by the processor unit 605. The processes of the different embodiments may be performed by the processor unit 605 using computer-implemented instructions, which may be located in a memory, such as the memory 607. These instructions are referred to as program code, computer-usable program code, or computer-readable program code that may be read and executed by a processor in the processor unit 605. The program code in the different embodiments may be embodied on different physical or tangible computer-readable media, such as the memory 607 or the persistent storage 609.

Program code 617 is located in a functional form on a computer-readable media 619 and may be loaded onto or transferred to the computing device 602 for execution by the processor unit 605. The program code 617 and the computer-readable media 619 form computer program product 621 in these examples. In one embodiment, the computer program product 621 is the authentication interface system 258 described in FIG. 3. In this embodiment, the program code 617 may include computer-usable program code capable of initiating, in conjunction with an online transaction, an authentication query via a communication device associated with a customer in the online transaction, receiving customer authentication data from the communication device, sending the customer authentication data to a third-party authentication server to authenticate the customer using the customer authentication data, receiving a determination from the third-party authentication server whether the customer is authenticated, and allowing the online transaction to proceed in response to receiving the determination that the customer is authenticated.

In another embodiment, the computer program product 621 is the authentication system 260 described in FIG. 3. In this embodiment, the program code 617 may include computer-usable program code capable of receiving customer authentication data from an authentication interface system. The customer authentication data is associated with a customer in an online transaction. The program code 617 may also include computer-usable program code capable of accessing customer reference data from a customer database, comparing the customer authentication data to the customer reference data to make a determination whether the customer is authenticated, and sending the determination as to whether the customer is authenticated to the authentication interface system. Any combination of the above-mentioned computer-usable program code may be implemented in the program code 617, and any functions of the illustrative embodiments may be implemented in the program code 617.

In one example, the computer-readable media 619 may be in a tangible form, such as, for example, an optical or magnetic disc that is inserted or placed into a drive or other device that is part of the persistent storage 609 for transfer onto a storage device, such as a hard drive that is part of the persistent storage 609. In a tangible form, the computer-readable media 619 also may take the form of a persistent storage, such as a hard drive or a flash memory that is connected to the computing device 602. The tangible form of the computer-readable media 619 is also referred to as computer recordable storage media.

Alternatively, the program code 617 may be transferred to the computing device 602 from the computer-readable media 619 through a communication link to the communications unit 611 or through a connection to the input/output unit 613. The communication link or the connection may be physical or wireless in the illustrative examples. The computer-readable media 619 also may take the form of non-tangible media, such as communication links or wireless transmissions containing the program code 617.

The different components illustrated for the computing device 602 are not meant to provide architectural limitations to the manner in which different embodiments may be implemented. The different illustrative embodiments may be implemented in a data processing system including components in addition to or in place of those illustrated for computing device 602. Other components shown in FIG. 8 can be varied from the illustrative examples shown.

As one example, a storage device in the computing device 602 is any hardware apparatus that may store data. The memory 607, the persistent storage 609, and the computer-readable media 619 are examples of storage devices in a tangible form.

In another example, a bus system may be used to implement the communications fabric 603 and may be comprised of one or more buses, such as a system bus or an input/output bus. Of course, the bus system may be implemented using any suitable type of architecture that provides for a transfer of data between different components or devices attached to the bus system. Additionally, the communications unit 611 may include one or more devices used to transmit and receive data, such as a modem or a network adapter. Further, a memory may be, for example, the memory 607 or a cache such as found in an interface and memory controller hub that may be present in the communications fabric 603.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

As used herein, including in the claims, the terms first, second, third, etc. . . . used in relation to, e.g., personal identification numbers (e.g., first personal identification number, second personal identification number, etc.) are for reference or identification purposes only, and these terms are not intended to describe or suggest a number, order, source, purpose, or substantive quality for any personal identification number or element for which such a term is used.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system, comprising:
an authentication server configured to:
receive, from a customer communication device associated with a customer, current customer authentication data including customer credential information, a personal identification number, and a customer voice sample in response to the customer initiating an online transaction;
receive, from the customer communication device, a current location of the customer communication device;
perform a customer credential comparison of the received customer credential information to pre-stored customer credential information;
perform a personal identification number comparison of a received personal identification number to a pre-stored personal identification number associated with the customer;
perform a customer voice sample comparison of a received customer voice sample to a pre-stored customer voice sample stored in a customer reference data of a customer database;
gather data regarding locations of previous authentication attempts made by the customer communication device;
perform a comparison of the current location to the locations of the previous authentication attempts;
authenticate the customer based on the customer credential comparison, the customer personal identification number comparison, the comparison of the locations of the previous authentication attempts to the current location, and the voice reference data comparison; and
based on successful authentication, allowing the online transaction to proceed.

2. The system of claim 1, wherein the customer database comprises the customer reference data for at least one customer in an online transaction.

3. The system of claim 1, wherein the authentication server accesses the customer database to retrieve the customer reference data.

4. The system of claim 1, wherein the authentication server interfaces with the customer via the customer communication device to receive the customer authentication data.

5. The system of claim 1, comprising a call manager comprising a private branch exchange in voice communication with the customer communication device.

6. The system of claim 5, wherein the call manager receives the customer voice sample from the customer communication device.

7. The system of claim 1, a messaging server configured to receive the personal identification number generated for a customer.

8. The system of claim 7, wherein the messaging server is configured to transmit the personal identification number to the customer communication device.

9. The system of claim 7, wherein the messaging server sends the personal identification number to the customer communication device using at least one of the following: e-mail, text message, or phone call.

10. The system of claim 1, comprising a web server configured to generate the personal identification number and transmit the personal identification number to the messaging server.

11. The system of claim 10, wherein the authentication server is configured to receive the customer authentication data from the web server.

12. The system of claim 1, wherein the customer voice sample consists of a predetermined word or phrase.

13. The system of claim 12, wherein the predetermined word or phrase is prompted to the customer communication device.

14. The system of claim 1, further comprising sending the customer voice sample to the authentication server.

15. A method, comprising:
- receiving, by an authentication server, and from a customer communication device associated with a customer, current customer authentication data including customer credential information, a personal identification number, and a customer voice sample in response to the customer initiating an online transaction;
- receiving, by the authentication server, a current location of the customer communication device;
- performing, by the authentication server, a customer credential comparison of the received customer credential information to pre-stored customer credential information;
- performing, by the authentication server, a personal identification number comparison of a received personal identification number to a pre-stored personal identification number associated with the customer;
- performing, by the authentication server, a customer voice sample comparison of a received customer voice sample to a pre-stored customer voice sample stored in a customer reference data of a customer database;
- gathering, by the authentication server, data regarding locations of previous authentication attempts made by the customer communication device;
- performing, by the authentication server, a comparison of the current location to the locations of the previous authentication attempts;
- authenticating, by the authentication server, the customer based on the customer credential comparison, the customer personal identification number comparison, the comparison of the locations of the previous authentication attempts to the current location, and the voice reference data comparison; and
- based on successful authentication, allowing the pending transaction to proceed.

16. The method of claim 15, wherein the customer database comprises the customer reference data for at least one customer in an online transaction.

17. The method of claim 15, wherein the authentication server accesses the customer database to retrieve the customer reference data.

18. The method of claim 15, wherein the authentication server interfaces with the customer via the customer communication device to receive the customer authentication data.

19. The method of claim 15, comprising communicating between a call manager comprising a private branch exchange with the customer communication device.

20. The method of claim 19, wherein the call manager receives the customer voice sample from the customer communication device.

* * * * *